United States Patent

Olti et al.

[19]

[11] Patent Number: 5,992,849
[45] Date of Patent: Nov. 30, 1999

[54] ELECTRONIC PUZZLE GAME

[76] Inventors: Yehiel Avraham Olti, MISGAV 2/35; Shlomo Blumberg, P.O. Box 545, both of Karmiel 20100; Gyora Mihaly Pal Benedek, 54 ABA Hushi Street, Haifa 34983; Zvi Herman, 4/1 Hakim Street, Haifa, 35430, all of Israel

[21] Appl. No.: 08/893,615

[22] Filed: Jul. 11, 1997

[51] Int. Cl.⁶ ................................. A63F 9/06; A63F 9/24
[52] U.S. Cl. .......................................... 273/153 R; 463/9
[58] Field of Search .............................. 463/1, 9, 30–32, 463/36, 38; 273/153 R, 155, 148 R, 148 B; 200/51 R, 61.45 R, 61.52, 61.53, 61.58 R, 182, 220

[56] References Cited

U.S. PATENT DOCUMENTS

| | | | |
|---|---|---|---|
| 4,099,040 | 7/1978 | Bitko | 200/220 |
| 4,575,087 | 3/1986 | Sinclair | 273/153 R |
| 4,809,979 | 3/1989 | Skowronski et al. | 463/9 |
| 4,817,950 | 4/1989 | Goo | 463/36 |
| 5,215,311 | 6/1993 | Schuller | 463/9 |
| 5,417,425 | 5/1995 | Blumberg et al. | |
| 5,794,569 | 8/1998 | Titus et al. | 119/721 |

OTHER PUBLICATIONS

Comus International, 263 Hillside Ave, Nutley, N.J. 07110; Information re switching devices and spec of non–mercury tilt switches. (2 pages) dated Oct. 1995.

*Primary Examiner*—Valencia Martin-Wallace
*Assistant Examiner*—Mark A. Sager
*Attorney, Agent, or Firm*—Mark M. Friedman

[57] ABSTRACT

An electronic puzzle device, including: (a) an array of indicators, each of the indicators capable of alternately indicating a first state or a second state, the array having an axis, which may or may not be physically indicated, dividing the array into a first portion and a second portion, and the array being capable of being folded along the axis such that each of the indicators in the first portion is corresponding to one of the indicators in the second portion; (b) a selection input for choosing or detecting a direction of the fold along said axis; and (c) a changer for changing the state of each of the indicators in the second portion depending upon the state of corresponding indicators in the first portion.

23 Claims, 17 Drawing Sheets

Side view from the east

ELECTRONIC PUZZLE GAME

FIELD AND BACKGROUND OF THE INVENTION

The present invention relates to an electronic puzzle game and, in particular, it concerns an electronic puzzle game which can be used to demonstrate important mathematical concepts.

A wide variety of puzzle devices are available, including both electronic and mechanical devices. An example of a mechanical puzzle device is Rubic's cube, in which the user rotates sections of a cube, each of which is composed of smaller cubes of different colors, in order to align the smaller cubes such that each side of the larger cube is of a single color. The disadvantage of such mechanical devices is that they are intrinsically limited to one type of problem to solve.

Electronic puzzle devices have the advantage of being more flexible and capable of including many different types of patterns or problems to solve, since these devices have memories which can store more than one type of problem or configuration of the puzzle. One example of a prior art electronic puzzle device is disclosed in U.S. Pat. No. 5,417,425, which has an array of lights that can either be turned on or off. In this device, the state of a light (either on or off), is changed when that light is selected by pressing, for example. However, selecting one light can lead to changes in the state (either on or off) of other lights, according to a preset pattern. The puzzle is solved by turning off all the lights. Thus, the user must find the correct sequence of selections to solve the puzzle.

However, this prior art electronic device, although an improvement over the prior art mechanical puzzle devices, is still lacking in many respects. For example, the array of lights is on a flat surface and each light is selected individually, so there is no manipulation of the game through two or three dimensional space, which was one of the attractions of the typical mechanical puzzle device. Thus, although the prior art electronic device of U.S. Pat. No. 5,417,425 represents an improvement, it is still lacking in many respects.

There is therefore a need for, and it would be useful to have, an electronic puzzle device which involves manipulations through two or three dimensional space.

SUMMARY OF THE INVENTION

According to the teachings of the present invention, there is provided an electronic puzzle device, including: (a) an array of indicators, each of the indicators capable of alternately indicating one of at least two states, the array having an axis dividing the array into a first portion and a second portion, and the array being capable of being folded along the axis such that at least one of the indicators in the first portion has a corresponding indicator in the second portion; (b) a selection input for choosing a direction of the fold along the axis; and (c) a changer for changing the state of the corresponding indicator in the second portion depending upon the state of the at least one indicator in the first portion, such that if the at least one indicator in the first portion is in a first state, the state of the corresponding indicator in the second portion is changed, and alternatively if the at least one indicator in the first portion is in a second state, the state of the corresponding indicator in the second portion is not changed.

Preferably, the array is substantially in the shape of a square. Alternately and preferably, the array is substantially in the shape of a cross. Preferably, the indicators are lights. More preferably, the indicators are LCD lights which can be back-lighted. Alternatively and preferably, the indicators are LED lights.

According to further preferred embodiments of the present invention, one of the states is indicated by the light being turned off. Alternatively and preferably, the first state is indicated by a first color and the second state is indicated by a second color.

According to still other preferred embodiments of the present invention, the axis of the array is placed such that the array is divided into two exactly equal portions. Alternatively and preferably, the axis of the array is placed such that the first portion is substantially larger than the second portion.

According to yet other preferred embodiments of the present invention, the device further includes an outer ring, the outer ring being attached to the array of indicators, such that the electronic puzzle device is grippable by the outer ring. Preferably, the selection input includes a tilt switch, the tilt switch featuring: (a) a ball for rolling within the outer ring when the electronic puzzle device is tilted; and (b) a plurality of switches disposed within the outer ring, the switches being sequentially contacted by the ball when the electronic puzzle device is tilted, such that the direction of folding is detected.

According to preferred embodiment of the present invention, the selection input includes a plurality of magnetic tilt switches, the magnetic tilt switches being attached to the electronic puzzle device, the magnetic tilt switches featuring: (a) a sealed tube; (b) a magnet for sliding within the tube when the electronic puzzle device is tilted; and (c) a Hall effect switch for being activated by the magnet, the Hall effect switch being located within the tube, such that when the Hall effect switch is activated by the magnet, the direction of folding is indicated.

Alternatively and preferably, the selection input includes a plurality of liquid tilt switches, the liquid tilt switches featuring: (a) a sealed tube; (b) a drop of liquid for sliding within the tube when the electronic puzzle device is tilted; and (c) a pair of contacts for being contacted by the drop of liquid, the contacts being located within the tube, such that when the contacts are contacted by the drop of liquid, the direction of folding is indicated.

According to still other preferred embodiments of the present invention, the device includes at least one solution, the solution being a predetermined pattern of the indicators, the pattern being determined according to the state of the indicators. More preferably, the pattern of solution includes having substantially all indicators in a single state. Preferably, the indicators are lights and the single state is selected from the group consisting of turned on and turned off. Preferably, the changer includes a micro-controller. Also preferably, the selection input includes a switch.

According to yet other preferred embodiments of the present invention, the array has a three-dimensional shape. More preferably, the three-dimensional shape is of a sphere.

According to the present invention, there is provided a tilt switch for indicating a direction of movement of a tilt, the tilt switch including: (a) a container; (b) a ball for rolling within the container when the container is tilted; and (c) a plurality of switches disposed within the container, the switches being sequentially contacted by the ball when the container is tilted, such that the direction of movement of the tilt is indicated. Preferably, the container features a plurality of seats, each of the seats having a corresponding switch, such that when the ball lies substantially within the seat, the corresponding switch is contacted.

Hereinafter, the term "folding" includes physically rotating or otherwise manipulating the game board to signify folding of the game board. The manipulations include, but are not limited to, touching or manipulating a physical button or switch, and selecting a menu choice or otherwise manipulating software. Thus, the term "folding" does not necessarily indicate that one portion of the game board is completely physically bent over a second portion of the game board, in the manner in which a piece of paper is folded, for example.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of an electronic puzzle game, which features an array of a plurality of indicators, each of which has at least two states. The objective of the game according to the present invention is to manipulate the indicators so that all indicators are in the same state. The indicators are manipulated, as further described below, by "folding" the game board along an axis which divides the game board into two portions, which may be of equal or unequal sizes. The axis may be physically indicated, for example by a line on the game board, although this is not necessary.

Each "fold" can result in a change of state for the indicators, as further described below. By selecting a sequence of particular "folds", the user causes all of the indicators to have the same state and thereby solves the puzzle. Thus, the goal of the game is to reach a predetermined target by solving a predetermined pattern, such as placing all of the indicators in the same state, by manipulating the game board through a series of "folds".

The electronic puzzle game of the present invention has both amusement and educational value. The challenge of placing all indicators in the same state is entertaining. However, the game also teaches a number of mathematical skills, including logic, Boolean algebra, group theory, pattern analysis and problem solving. Furthermore, the electronic puzzle game of the present invention has the advantage of presenting a clear initial problem, so that these mathematical skills can be more easily taught.

The principles and operation of an electronic puzzle game according to the present invention may be better understood with reference to the drawings and the accompanying description, it being understood that these drawings are given for illustrative purposes only and are not meant to be limiting.

Figure 1:
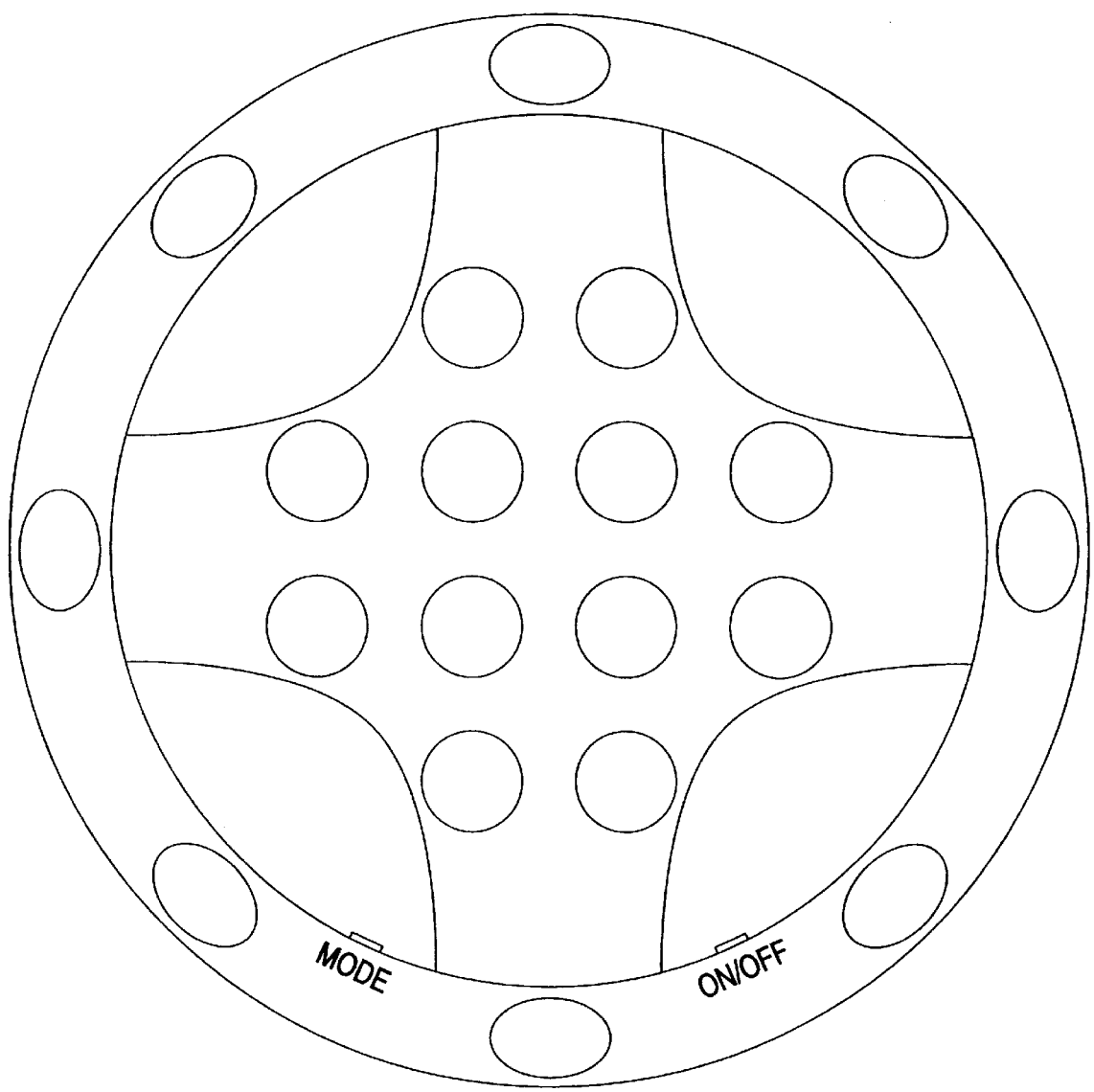
FIG. 1 is an illustration-of one embodiment of the present invention.

Referring now to the drawings, FIG. 1 shows an exemplary illustration of one embodiment of an electronic puzzle game according to the present invention. In this example, the electronic puzzle game is shown as a hand-held device 90 which is similar in appearance to the steering wheel of an automobile, although of course other geometrical shapes could be used.

Figure 2A:
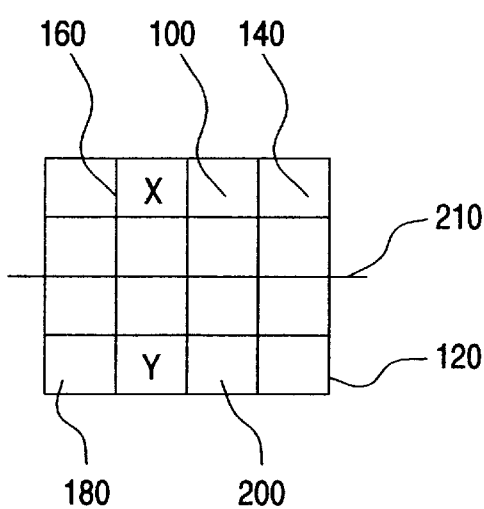
FIGS. 2A and 2B are schematic illustrations of two exemplary embodiments of the game board of the electronic puzzle of the present invention.
Figure 2B:
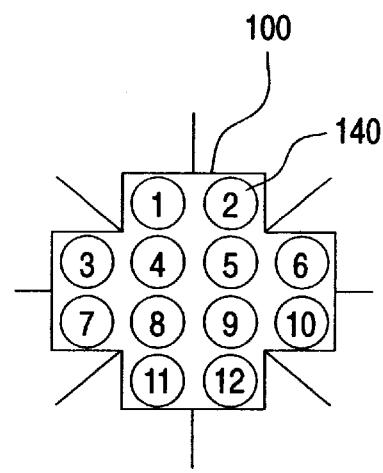

FIGS. 2A and 2B are schematic illustrations of two exemplary embodiments of the game board of the electronic puzzle of the present invention. In both FIGS. 2A and 2B, game board 100 has an array of indicators 120. Each indicator 140 is capable of indicating at least two states, as illustrated, although more than two states may also be indicated. For the purposes of clarity, the following discussion will describe indicators with two states only, it being understood that this is not intended to be limiting in any way. Examples of indicator 140 include, but are not limited to, LCD, LED or other light systems providing visual cues. Most preferably, indicator 140 is an LCD or LED which is visible from both sides. Examples of states of indicator 140 include, but are not limited to, lit and not lit ("on" and "off"), a first color and a second color, and flashing and not flashing. Hereinafter the term "flashing" is defined as rapidly and repeatedly alternately being lit and not lit.

Array 120 can be either two-dimensional or three-dimensional, but is preferably arranged in the form of a two-dimensional grid 160. Grid divides at least the surface of game board 100 into a plurality of separate spaces 180, preferably squares as illustrated. For the purposes of clarity, each space will be hereinafter designated as square 200, although other geometrical shapes could be used. More preferably, as shown in FIG. 2A, grid 160 is marked in four rows of squares 200, with four squares 200 per row. Alternatively and most preferably, as shown in FIG. 2B, grid 160 is in the shape of a cross with only twelve squares 200, although of course other configurations are possible. In the preferred embodiments illustrated, each indicator 140 is placed within each square 200.

Hereinafter, the operation of the electronic puzzle game of the present invention will be described using the embodiment of game board 100 shown in FIG. 2A, it being understood that this is done for purposes of clarity only and is not meant to be limiting. The electronic puzzle of the present invention is operated as follows. Game board 100 can be "folded" along a horizontal center line 210 as shown. Hereinafter, the term "folding" includes physically turning or otherwise manipulating game board 100 to signify folding of game board 100, as well as touching or manipulating a physical button or switch, and selecting a menu choice or otherwise manipulating software. Thus, the term "folding" does not necessarily indicate that one portion of game board 100 is completely or even partially physically bent over a second portion of game board 100. However, as further described below, game board 100 reacts as though such bending physically occurs.

The effect of folding game board 100 is to place certain squares 200 over their counterparts on the opposite side of game board 100, in a virtual if not necessarily a physical sense. For example, as shown in FIG. 2, square 200 marked with an "X" (hereinafter designated "square X") on the top half of game board 100 would be placed over square 200 marked with an "Y" (hereinafter designated "square Y") on the bottom half of game board 100, if the top half of game board 100 was folded over the bottom half along horizontal center line 210. If game board 100 is not physically bent, folding is signified by some other manipulation of game board 100, such as pressing a button, selecting a menu choice, rotating the entire device, or by selecting both an axis and a direction of folding (not shown). Game board 100 reacts to this folding, physical or virtual, by causing one or more indicators 140 to change state according to the following rules. For clarity, indicator 140 on square "X" is described as "indicator X" and indicator 140 on square "Y" is described as "indicator Y".

If indicator "X" is lit, such folding causes indicator "Y" to change state, so that if indicator "Y" was lit, indicator "Y" is turned off; and if indicator "Y" was not lit, indicator "Y" is turned on. If indicator "X" is not lit, indicator "Y" does not change state. Indicator "X" does not change state in any case. Similarly, all indicators 140 on the bottom half of game board 100 change state if corresponding indicators 140 on the top half of game board 100 are lit. Indicators 140 on the top half of game board 100 do not change state.

Figure 3A:
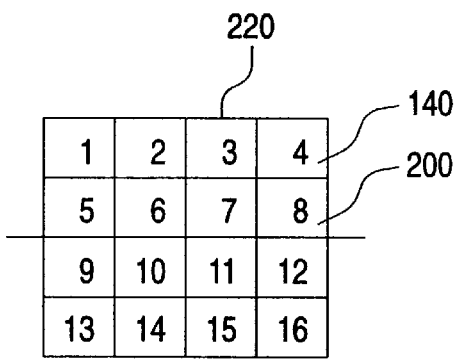
FIG. 3A schematically illustrates an embodiment of the game board of FIG. 2A, while FIGS. 3B–3E demonstrate some possible manipulations of the game board of FIG. 3A.

Further examples of some possible manipulations of game board 100, shown in FIG. 3A, are given in FIGS. 3B–3E. A game board 220 is shown in FIG. 3A, corresponding to game board 100 of FIG. 2. For clarity, each square 200, and thus each indicator 140, on game board 220 is numbered, it being understood that such numbering is only for discussion purposes and is not intended to indicate a limiting feature of the electronic puzzle game of the present invention. Thus, square 200 with a numeral "1" will be referred to as "square 1".

In the top-to-bottom fold of FIG. 3A, in which the top half of game board 220 is folded over the bottom half, indicators 140 will change state as follows. Square 1 affects square 13, so that if indicator 140 on square 1 is lit, indicator 140 on square 13 will change state and either turn on or turn off. Square 2 affects square 14, so that if indicator 140 on square 2 is lit, indicator 140 on square 14 will change state. Square 3 affects square 15, so that if indicator 140 on square 3 is lit, indicator 140 on square 15 will change state. Square 4 affects square 16, so that if indicator 140 on square 4 is lit, indicator 140 on square 16 will change state. On the second row, square 5 affects square 9, so that if indicator 140 on square 5 is lit, indicator 140 on square 9 will change state. Square 6 affects square 10, so that if indicator 140 on square 6 is lit, indicator 140 on square 10 will change state. Square 7 affects square 11, so that if indicator 140 on square 7 is lit, indicator 140 on square 11 will change state. Square 8 affects square 12, so that if indicator 140 on square 8 is lit, indicator 140 on square 12 will change state. As noted above, indicators 140 in squares 200 in the top half of game board 220 must be lit in order for indicators 140 in corresponding squares 200 in the bottom half to change state.

Figure 3B:
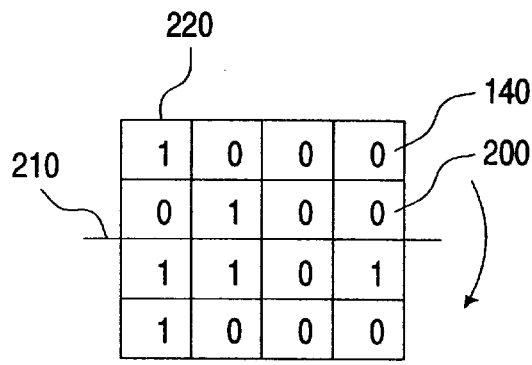
Figure 3C:
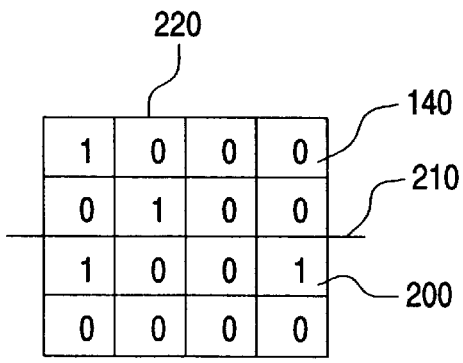

One example of the effect of folding is shown in FIGS. 3B and 3C. FIG. 3B shows the state of indicators 140 on all squares 200 of game board 220 before folding. For the purposes of clarity, the state of each indicator 140 is indicated with a numeral in square 200, either "1" if indicator 140 is lit or turned on, or "0" if indicator 140 is not lit or turned off. As in FIG. 2, the top half of game board 220 is folded over the bottom half of game board 220 along central horizontal line 210.

The results of this fold are shown in FIG. 3C. Indicators 140 in squares 10 and 13 changed state from "1" to "0", thereby indicating that indicators 140 were turned off in squares 10 and 13. Only these two squares on the bottom half were affected, since only two squares, squares 6 and 1, had indicators 140 that were lit or "on" in the top half of game board 220. Thus, all indicators 140 in other squares 200 in the bottom half remained unchanged.

Figure 3D:
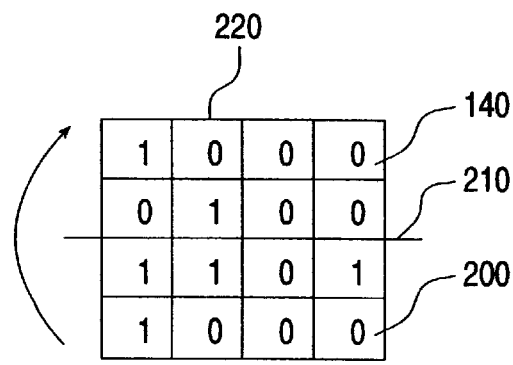
Figure 3E:
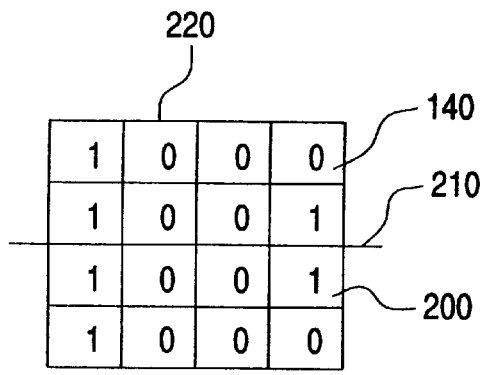

FIGS. 3D and 3E demonstrate one example of folding the bottom half over the top half of game board 220 along central horizontal line 210, which is the opposite of the fold illustrated in FIGS. 3B and 3C. FIG. 3D shows the state of indicators 140 on all squares 200 of game board 220 before folding. The state of each indicator 140 is indicated as for FIGS. 3B and 3C, where the numeral "1" indicates the "on" or lit state, and the numeral "0" indicates the "off" or unlit state.

The results of this fold are shown in FIG. 3E. Indicators 140 in squares 1, 5, 6 and 8 changed state. Indicators 140 in squares 1 and 6 changed state from "1" to "0", thereby indicating that indicators 140 were turned off in squares 1 and 6. Indicators 140 in squares 5 and 8 changed state from "0" to "1", thereby indicating that indicators 140 were turned on in squares 5 and 8. As in the above examples, only these four squares 200 on the top half of game board 220 were affected, since only four squares 200, squares 9, 10, 12 and 13, had indicators 140 that were lit or "on" in the bottom half of game board 220. Thus, all indicators 140 in other squares 200 in the top half of game board 220 remained unchanged.

Figure 4A:
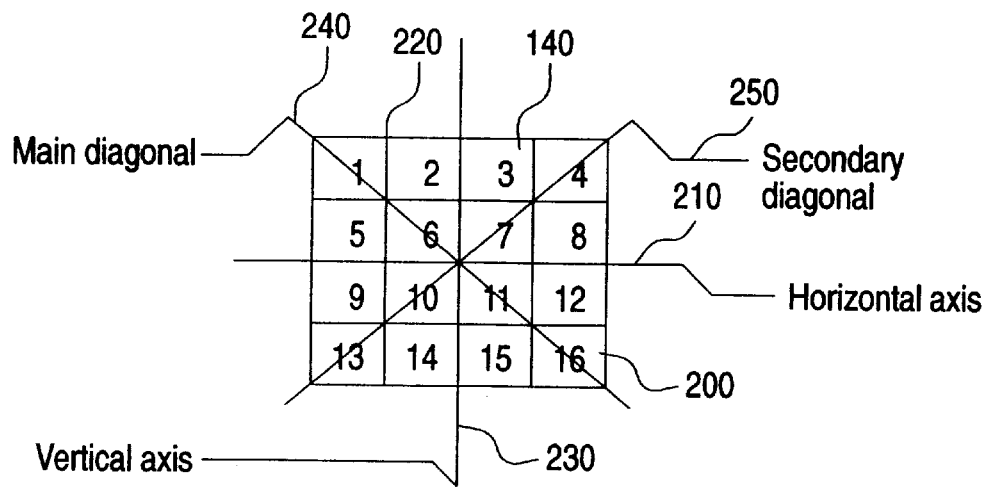
FIGS. 4A–4C demonstrate other examples of more advanced manipulations of the game board of FIG. 2A.
Figure 4B:
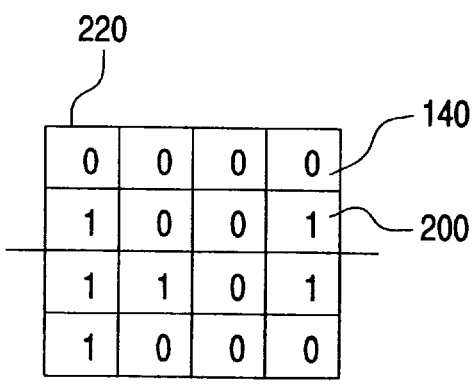
Figure 4C:
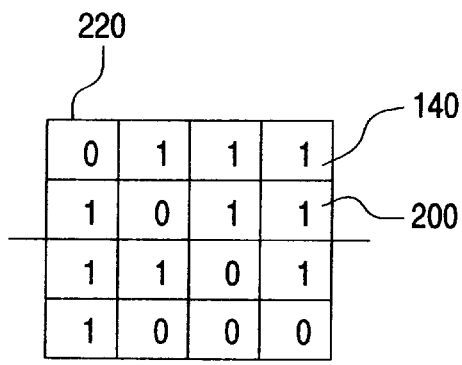

Of course, more advanced manipulations of the game board of FIG. 2 are possible, as shown in FIGS. 4A–4C. FIG. 4A illustrates other axes about which game board 220, numbered as in FIG. 3A for clarity only, can be folded. These other axes include a vertical axis 230, a main diagonal axis 240 and a secondary diagonal axis 250. To further aid explanations of folding about main and secondary diagonal axes 240 and 250, the directions of the compass are indicated for illustrative purposes only.

Game board 220 can be folded about vertical axis 230 from left to right, or in the opposite manner, from right to left. It should be noted that folding from right to left is the mirror opposite of folding from left to right. In fact, in each of the following folds, the term "opposite manner" indicates that the fold is the mirror opposite. For example, if in one fold square 1 affects square 4, in the opposite fold square 4 affects square 1. Game board 220 can be folded about main diagonal axis 240 from top right to bottom left, which is NE to SW, or in the opposite manner, from bottom left to top right, which is SW to NE. Game board 220 can be folded about secondary diagonal axis 250 from top left to bottom right, which is NW to SE, or in the opposite manner, from bottom right to top left, which is SE to NW. However, it should be noted that although the fold is the mirror opposite, the effect of the fold, in terms of the alteration of the state of indicator(s) 140, will not necessarily be the mirror opposite.

Examples of the effect of these folds are given in Table 1 below. It should be noted that the column labeled "Fold"

indicates the type of fold, and "Square X" affects "Square Y", so that if the indicator in Square X is lit, the indicator in Square Y will change state. For example, the first row shows the left-to-right fold along vertical axis 230 in which square 1 affects square 4, so that if indicator 140 on square 1 is lit, indicator 140 on square 4 will change state and either turn on or turn off.

TABLE 1

State of Squares After Various Folds

| Fold | Square X | Square Y |
| --- | --- | --- |
| left-to-right along vertical axis 230 | 1 | 4 |
|  | 2 | 3 |
|  | 5 | 8 |
|  | 6 | 7 |
|  | 9 | 12 |
|  | 10 | 11 |
|  | 13 | 16 |
|  | 14 | 15 |
| top right (NE) over bottom left (SW) along main diagonal 240 | 2 | 5 |
|  | 3 | 9 |
|  | 4 | 13 |
|  | 7 | 10 |
|  | 8 | 14 |
|  | 12 | 15 |
| top left (NW) over bottom right (SE) along secondary diagonal 250 | 1 | 16 |
|  | 2 | 12 |
|  | 3 | 8 |
|  | 5 | 15 |
|  | 6 | 11 |
|  | 9 | 14 |

FIGS. 4B and 4C illustrate one example of a more complex fold about the main diagonal (not shown). FIG. 4B shows game board 220 before the fold occurs, with indicators 140 designated by numerals as in the above examples. For purposes of clarity only, the portion of game board 220 which lies to the right of the main diagonal is referred to as the "right side", and the portion of game board 220 which lies to the left of the main diagonal is referred to as the "left side". In this example, the bottom left of game board 220 is folded over the top right (SW to NE) along the main diagonal. Thus, the left side is folded over the right side.

FIG. 4C shows game board 220 after the fold. Indicators 140 in squares 2–4, and 7 changed state. Indicators 140 in squares 2–4 and 7 changed state from "0" to "1", thereby indicating that indicators 140 were turned on in squares 2–4 and 7. As in the above examples, only these four squares 200 on the right side of game board 220 were affected, since only four squares 200, squares 5, 9, 10 and 13, had indicators 140 that were lit or "on" in the left side of game board 220. Thus, all indicators 140 in other squares 200 in the right side of game board 220 remained unchanged.

It should be noted that most of the above examples show folds of the game board about a symmetrical axis, so that one-half of the game board is folded over the other half of the game board. However, other possible configurations could include asymmetrical folds, in which a first portion of the game board is folded over the second portion, the first portion being either substantially larger or substantially smaller than the second portion.

The above examples show the results of a single fold. However, in order to solve many puzzles of the game of the present invention, more than one step may be required.

Figure 5A:
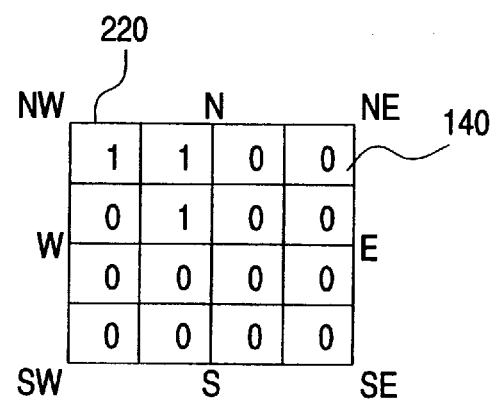
FIGS. 5A–5D show one example of a puzzle solution.
Figure 5B:
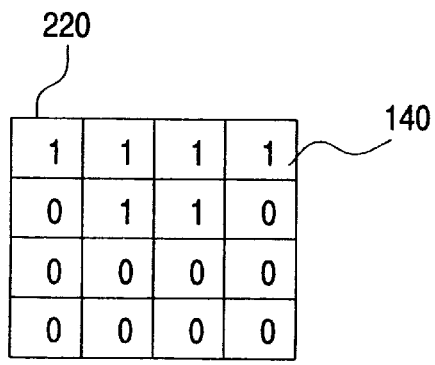
Figure 5C:
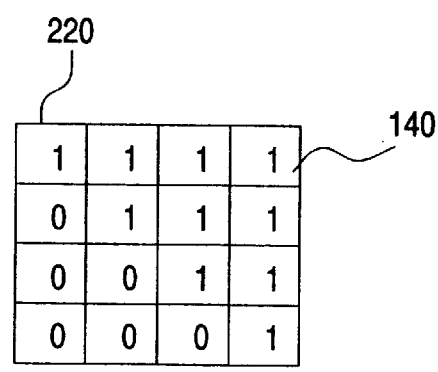
Figure 5D:
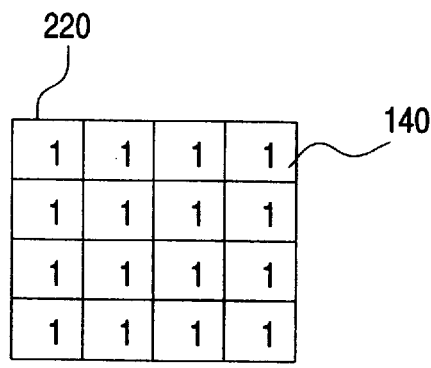

FIGS. 5A–5D show one example of the steps required for an optimal multi-step puzzle solution. FIG. 5A shows the initial state of indicators 140 on game board 220 as in the above examples, with directions of the compass given for further clarity. In the first step, game board 220 is folded from left to right (W to E) about the vertical axis (not shown). The result is shown in FIG. 5B. In the second step, game board 220 is folded from the top left to the bottom right (NW to SE) about the secondary axis (not shown). The result is shown in FIG. 5C. Finally, game board 220 is folded from the top right to the bottom left about the main diagonal (not shown). The result is shown in FIG. 5D, in which all indicators 140 are in the same state, the "on" or lit state, and the puzzle has been solved. It is appreciated that the puzzle could alternately be solved by placing all indicators 140 in the opposite, or "off", unlit state, depending upon how game board 220 is configured.

This example of a puzzle solution clearly demonstrates the improvement of the electronic puzzle device of the present invention over prior art electronic devices. First, the greater complexity and difficulty of the game of the present invention increases both the challenge involved and the entertainment value. Finally, the potential for physical manipulation of the device by the user, as further shown in FIGS. 7, 9 and 10, also increases the enjoyment of the game, particularly for users who are fond of mechanical puzzles.

Figure 6:
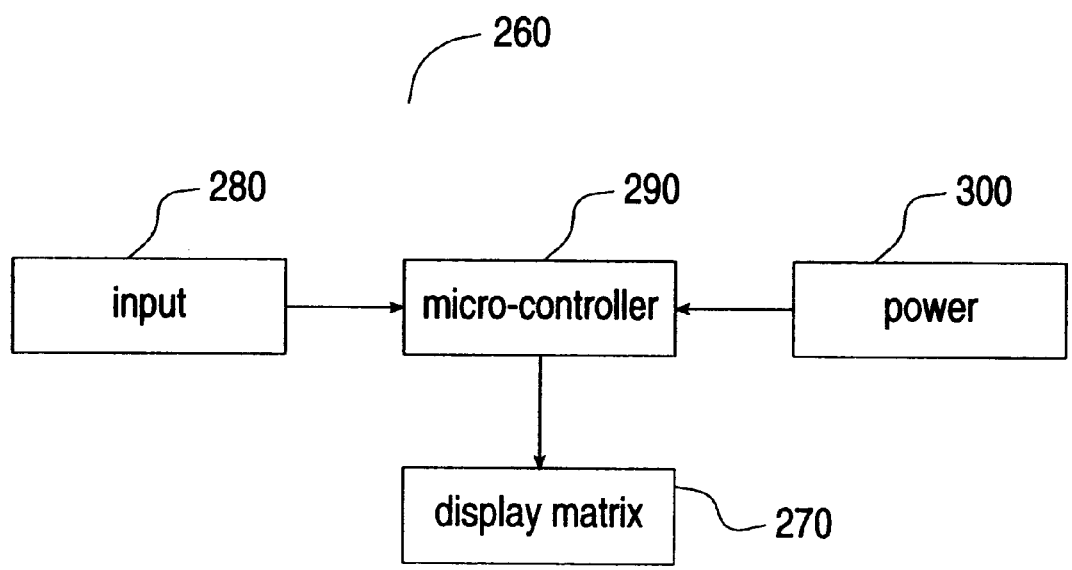
FIG. 6 schematically illustrates one possible embodiment of the electronic puzzle game of the present invention as a stand-alone hand-held device.

One embodiment of the puzzle device of the present invention is as a stand-alone hand-held device, shown schematically in FIG. 6. A hand-held device 260 includes a display matrix 270 for displaying the state of each indicator (not shown). Thus, at least game board 100 is represented on display matrix 270, although other information can be displayed as well.

A selection input 280 is used to determine the type and direction of fold to be performed, including both choosing the direction of the fold and detecting the type of fold which the user would like to make, such that the phrase "choosing the direction of the fold" includes detecting the desired type of fold. Selection input 280 can be a transparent touch screen, a keyboard, a set of buttons around the edge of display matrix 270, or any other type of switch or control. Most preferably, as illustrated in FIGS. 7–9, selection input 280 is a tilt switch which can be manipulated in three-dimensional space. Once the type and direction of a fold is chosen through selection input 280, the choice is sent to a micro-controller 290, which is one example of a changer for changing the state of an indicator. Micro-controller 290 may include software algorithms, electronic memory and I/O lines for communication with the rest of hand-held device. After the choice is sent to micro-controller 290, micro-controller 290 then updates both the electronic memory and display matrix 270 to indicate the change or changes in state of the indicators, if any such changes are to be made. A power supply 300 gives power to micro-controller 290 and display matrix 270, enabling hand-held device 260 to be operative. Power supply 300 preferably includes one or more batteries or other portable power source.

Figure 7A:
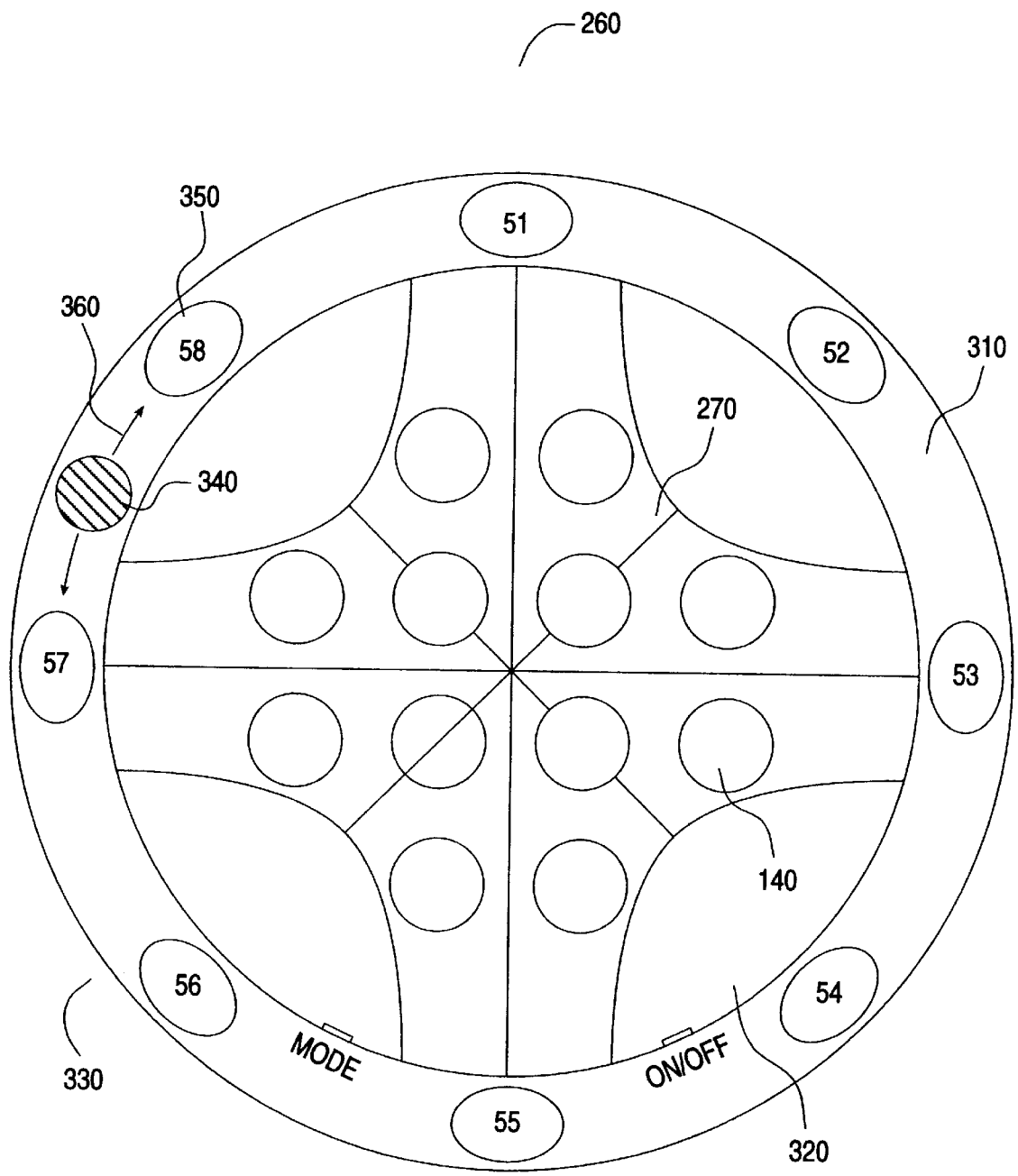
FIGS. 7A–7C illustrate an exemplary embodiment according to FIG. 6.
Figure 7B:
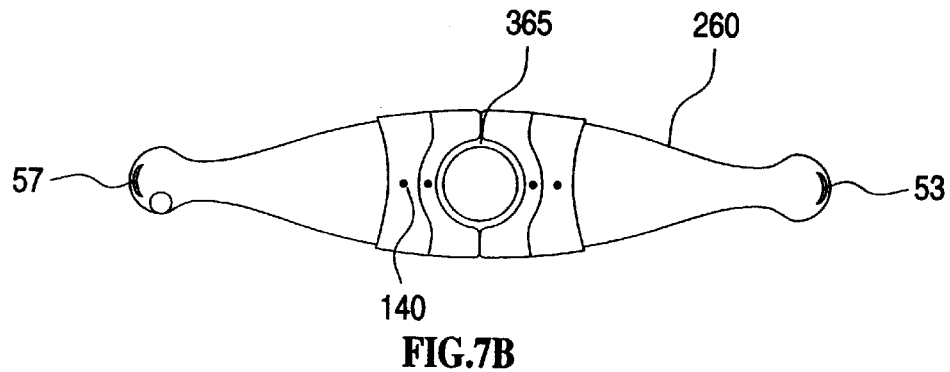
Figure 7C:
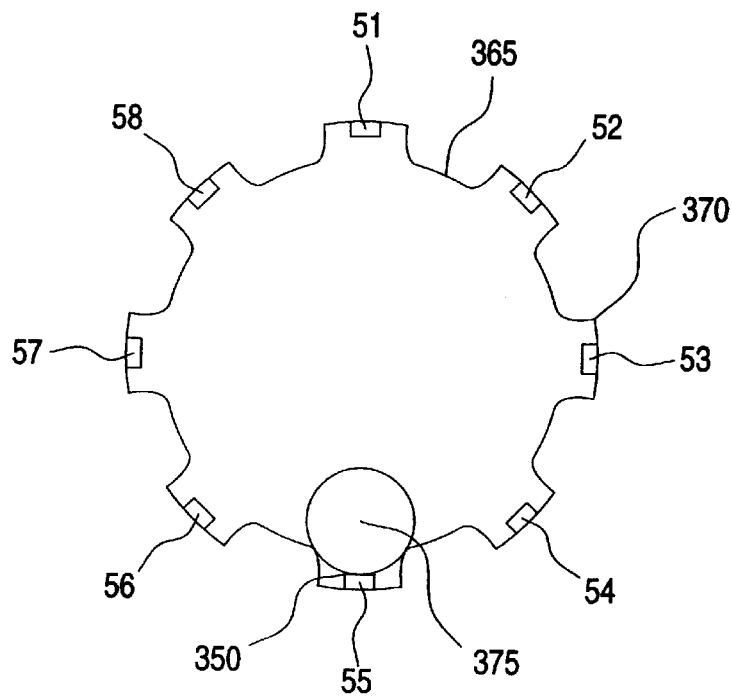

FIGS. 7A–7C illustrate an exemplary embodiment of hand-held device 260, based upon the schematic of FIG. 6. In FIG. 7A, display matrix 270 is located centrally on hand-held device 260. As in the previous description, display matrix 270 has indicators 140, shown in the shape of a cross as in FIG. 2B above. Display matrix 270 is connected to an outer ring 310, preferably by a plurality of spokes 320. More preferably, as illustrated herein, there are four spokes 320. The overall appearance of hand-held device 260 in this example is thus similar to the steering wheel of an automobile, although of course other geometrical shapes could be used. The electronic puzzle device shown is thus grippable by outer ring 310.

In this example, outer ring 310 is substantially hollow in order to accommodate a tilt switch 330. As shown in FIG. 7A, tilt switch 330 includes a ball 340 and a plurality of switches 350, preferably 8 switches 350 (labeled "S1" to "S8"). In the embodiment shown, switches 350 are located along one side of the interior surface of outer ring 310, although alternatively and preferably switches 350 are located along both sides of the interior surface of outer ring 310 to improve the symmetrical behavior of tilt switch 330.

Ball 340 rolls within outer ring 310, as indicated by arrows 360, as hand-held device 260 is moved through three-dimensional space by the user (not shown). In this example, ball 340 is moved by the force of gravity. This movement of ball 340 within outer ring 310 allows the user to select a particular direction in which to "fold" game board 100. The selection is made as follows.

As ball 340 rolls within outer ring 310, switches 350 are sequentially contacted. The user selects a particular direction to "fold" game board 100 by causing ball 340 to contact one of switches 350. For example, if switch 350 labeled "S1" is contacted by ball 340, then a fold from the bottom of game board 100 to the top of game board 100 along the horizontal axis is selected. In one variation of this embodiment, the last switch 350 which is contacted by rolling ball 340 is the selected switch. Alternatively and preferably, a single tilt switch of the type shown in FIGS. 8A–8C could be added to hand-held device 260. This tilt switch would sense when hand-held device 260 had been tilted out of plane and would then activate sampling of switches 350, so that the particular switch 350 currently being contacted by ball 340 is the selected switch.

In a second embodiment, the selection can be made more precisely by incorporating an extra feature into tilt switch 330, as shown in FIG. 7B and enlarged in FIG. 7C. In this example, the tilt switch mechanism is placed substantially in the center of hand-held device 260, in a hollow sphere 365. There are a plurality of seats 370 and an internal ball 375 in hollow sphere 365, as shown in an enlarged view in FIG. 7C. The closest indicators 140 are substantially curved to accommodate ball 375. Each seat 370 corresponds to one switch 350. Each seat 370 is an indentation which is large enough to hold at least a portion of ball 375. When the user holds hand-held device 260 substantially level, or parallel to the ground, ball 375 rolls freely within hollow sphere 365. When the user wants to select a particular switch 350, and hence a particular fold, the user simply tilts hand-held device 260 so that ball 375 is held by seat 370. In FIG. 7C, ball 375 is held by seat 370 corresponding to switch 350 "S5".

Other types of tilt switches include, but are not limited to, any type of gyroscopic or gravitational switch, which could be substituted for tilt switch 330 in order to obtain a similar effect. Other types of tilt switches can also be used in which each switch is a self-contained unit, as shown in FIGS. 8A–8C below.

As an optional feature, hand-held device includes a mode switch 373 for selecting a pattern of states of indicators 140. This selection enables the user to choose a pattern to solve. For example, in one pattern three indicators 140 might be in the state of being turned on, while the remaining indicators 140 might be in the "off" state. Of course, the level of complexity of the pattern is also preferably increased as new patterns are selected through mode switch 373.

Figure 8A:
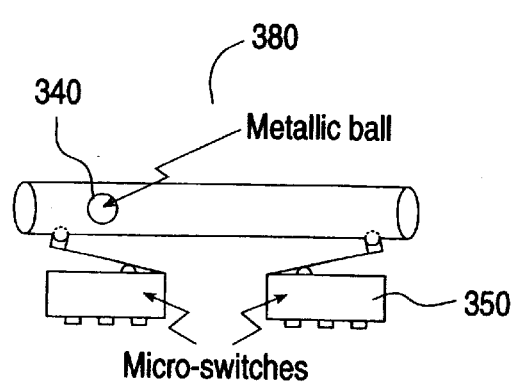
FIGS. 8A–8C illustrate examples of tilt switches for use with the present invention.

FIG. 8A shows a mechanical switch 380 which is similar in purpose to tilt switch 330 of FIGS. 7A–7C, except that mechanical switch 380 is a self-contained unit, and a plurality of mechanical switches 380 is required to indicate the direction of the desired "fold" of the game board.

Figure 8B:
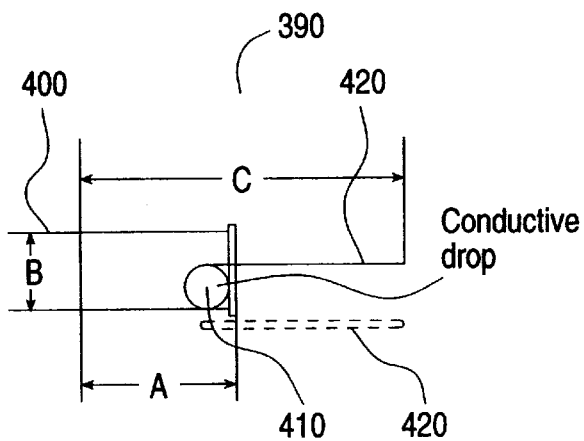
Figure 8C:
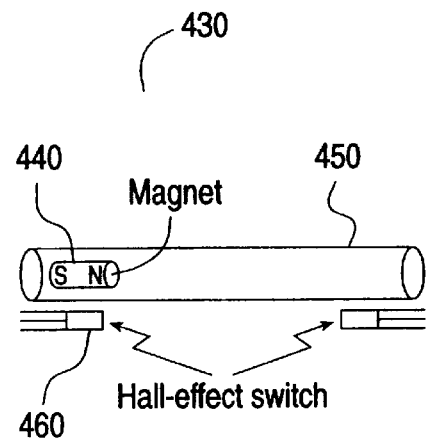

FIG. 8B shows a commercially available tilt switch, known as a liquid switch 390. Liquid switch 390 features a hermetically-sealed container 400. Container 400 has a drop of a liquid 410 which can act as a conductor for electricity, and two contacts 420 situated at one edge of container 400. Liquid 410 can be mercury, but is preferably a substantially non-toxic material which conducts electricity. When liquid 410 comes into contact with contacts 420, liquid can short contacts 420. However, liquid 410 is only able to do so when container 400 is held at certain angles and will flow away when container 400 is tilted, leaving contacts 420 disconnected. Thus, liquid 410 corresponds to ball 340 in tilt switch 330 above, and contacts 420 correspond to one switch 350 in tilt switch 330 above.

FIG. 8C illustrates an example of a mechanical/electronic implementation of the tilt switch. In FIG. 8C, a magnetic tilt switch 430 is shown. Magnetic tilt switch 430 is similar to mechanical switch 380 of FIG. 8A. However, instead of ball 340, there is a magnet 440. Magnet 440 can be spherical or tubular in shape, but is preferably tubular as shown. Magnet 440 moves along a tube 450 and contacts a plurality of Hall effect switches 460, which correspond to switches 350 of FIG. 8A. One advantage of magnetic tilt switch 430 is a clean, "bounce-free" or vibration-free operation.

Figure 9A:
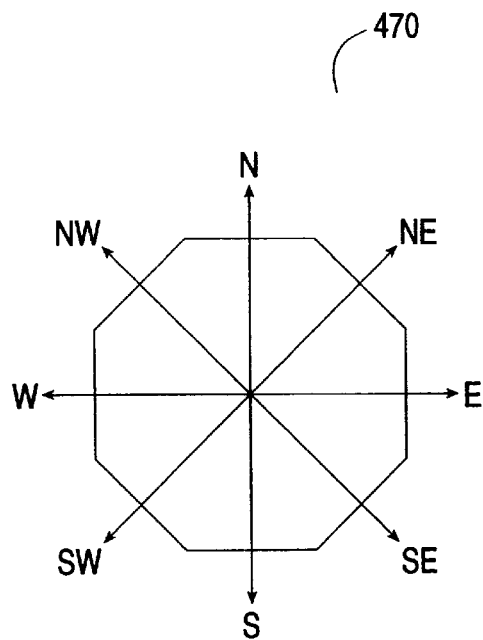
FIGS. 9A–9D illustrate another embodiment of the hand-held device of the present invention according to FIG. 6.
Figure 9B:
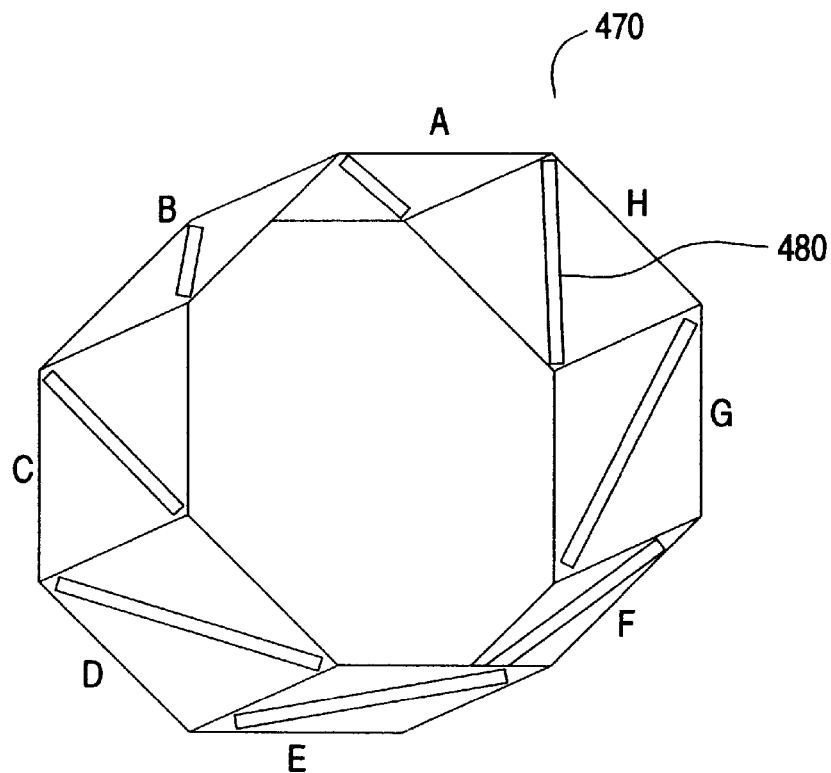

FIGS. 9A–9D illustrate another embodiment of the hand-held device of the present invention. In this embodiment, the hand-held device is substantially octagonal in shape, with eight sides. FIG. 9A shows a schematic diagram of an octagonal hand-held device 470 according to this embodiment. Various directions of the compass are indicated for clarity only. A tilt switch 480, which may be any of the examples of tilt switches given in FIGS. 8A–8C, is attached at an angle of about 45 degrees to each of eight sides of hand-held device 470. FIG. 9B shows the positions and orientation of tilt switches 480 on hand-held device 470.

Hand-held device 470 is operated as follows, with reference to FIGS. 9C and 9D. In this embodiment, hand-held device 470 is initially held substantially horizontally with one of the octagonal surfaces facing upward. Since all surfaces are functionally identical, operation of hand-held device 470 does not depend upon which surface is facing upward.

Figure 9C:
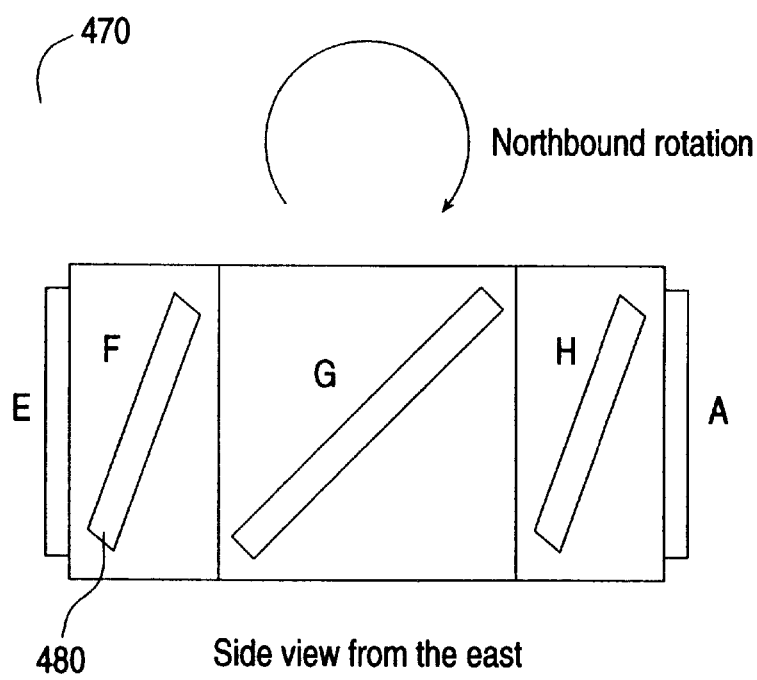
Figure 9D:
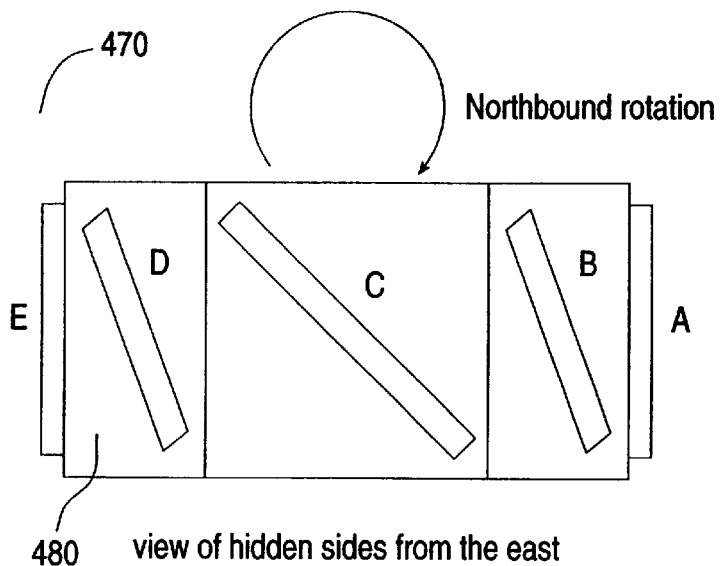

The initial position of hand-held device 470 is shown in FIG. 9C from the east side. Switch G is seen in full view, while the other switches are shown as projections. Switches A and E are fully vertical, switch G is at a 45-degree angle, and switches F and H are at an angle between that of switch G and of switches A and E. As hand-held device 470 is turned clockwise to the north, around the east-west axis, the first switch to become activated is switch G, since it is at the smallest angle. As turning proceeds, switches F and H will become activated next, and switches A and E will be activated last of the illustrated switches.

Switches on the hidden side of hand-held device 470, which is not visible from the east, will be activated after the switches illustrated in FIG. 9A. As shown in FIG. 9B, the angles of switches B, C and D are all greater than 90 degrees, so they will be activated after switches A, E, F, G and H. All switches A–H will be activated in sequence according to the angle of switch, with switches at smaller angles being activated before switches at steeper angles.

Figure 10A:
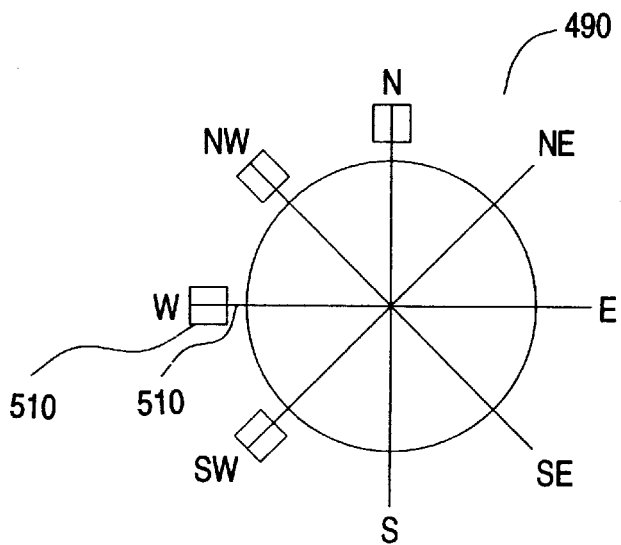
FIGS. 10A–10C illustrate a third embodiment of the hand-held device of the present invention according to FIG. 6.
Figure 10B:
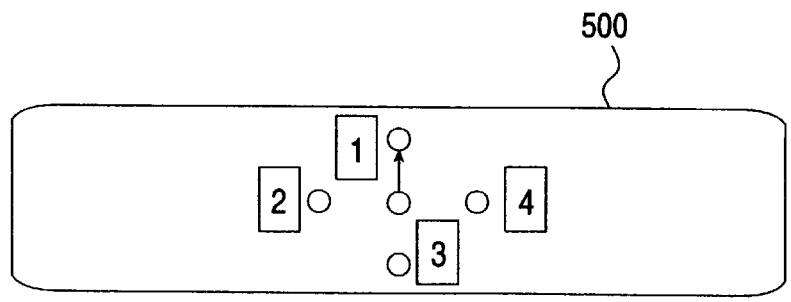
Figure 10C:
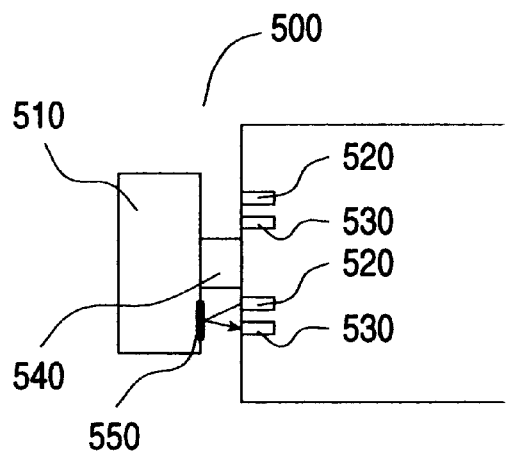

FIGS. 10A–10C illustrate a third embodiment of a hand-held device of the present invention. In this embodiment, the direction of "folding" is indicated by turning one of a plurality of knobs, or alternatively and preferably by holding the knob steady and then physically rotating the body of the hand-held device. For example, FIG. 10A shows a schematic diagram of a rotary hand-held device 490 with four axes of rotation indicated for clarity. Axes are as follows: South-North (S-N), East-West (E-W), Northwest-Southeast (NW-SE) and Northeast-Southwest (NE-SW). A rotary switch 500 can be placed at each axis in such a way that the rotary switch axis coincides with the relevant game axis. Each rotary switch 500 has a knob 510.

The four positions of rotary switch 500 are aligned as shown in FIG. 10B. If knob 510 of rotary switch 500 is held firmly by one hand and the main portion of hand-held device 490 is rotated by 180 degrees, rotary switch 500 goes from position 1 to position 3, either through position 2 or position 4 according to the direction of the rotation. Thus, by holding the appropriate knob 510, the desired axis is selected and the appropriate rotary switch 500 identifies the direction of the "fold" according to the sequence of positions.

In order to prevent a user from rotating only knob 510, a tilt switch will be incorporated, such as those illustrated in FIGS. 8A–8C. The tilt switch (not shown) will be mounted perpendicularly to one surface of hand-held device. One of two contacts will be activated, depending upon the surface which is facing upward. If substantially the entirety of hand-held device 490 is rotated, the tilt switch will change states, in that the activated contact will become deactivated while the deactivated contact will activate, and the rotation will be entered. Otherwise, the rotation will be ignored.

Optionally, if an indicator for the orientation of hand-held device 490 is included, rotary switches 500 can be simplified by eliminating positions 1 and 3. Preferably, each axis will have two rotary switches 500, one at each end, each of which is identical in function.

FIG. 10C shows a more preferred embodiment of the rotary switch of FIGS. 10A and 10B. In this embodiment, rotary switch 500 has at least one emitter 520 and at least one detector 530 on each of both sides of rotary axis 540. Emitter 520 will emit light, which is then reflected from a reflector 550 on the inside of knob 510 towards detector 530. Thus, detector 530 will only be able to detect light when reflector 550 of knob 510 passes sufficiently close to emitter 520 and detector 530, indicating rotation of knob 510. Alternatively and preferably, a small magnet can be embedded in knob 510 and two Hall effect sensors positioned so that one is on each side of rotary axis 540 (not shown).

Another alternative solution, which is relatively simpler, includes two sets of two contacts. Each set is placed on one side of rotary axis 540. A slider is installed in knob 510, acting as a rotating slide switch. When the slider is in a first position, the first set of contacts are connected and electricity passes through them. When the slider is in the second position, the second set of contacts are connected. Depending upon the particular set of contacts which are connected, the user is able to select the direction of folding.

FIGS. 11A–11M illustrate one possible embodiment of the electronic puzzle game of the present invention as a computer game, as it would appear on the screen of the computer. These figures show the operation of the computer game in terms of a sequence of displays on the screen of the computer, and are equivalent to FIGS. 5A–5D which were previously described.

Figure 11A:
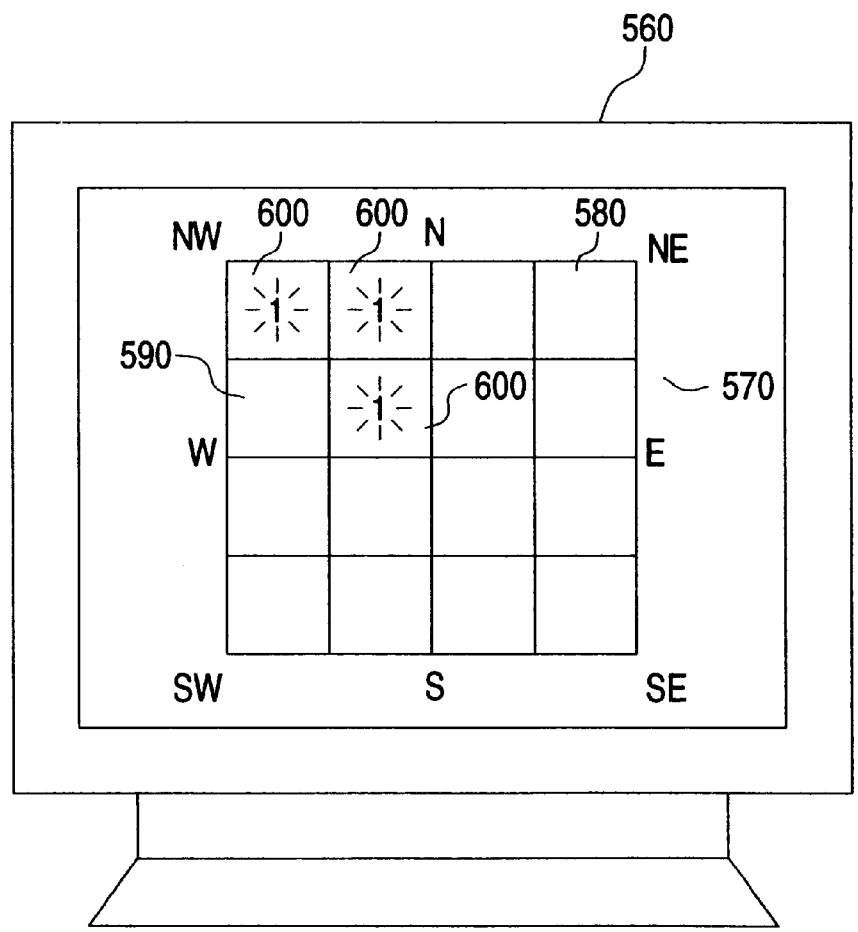
FIGS. 11A–11M show one example of an embodiment of the electronic puzzle game of the present invention as a computer game.

FIG. 11A shows a video screen 560, which could be the monitor screen of a personal computer or of another type of electronic device having such a screen. Video screen 560 is displaying a game board 570 substantially according to FIG. 2A of the present invention, which is the starting display of the game of the present invention. The directions of the compass (N, S, E, W, etc.) are given for clarity only and would not necessarily be shown on video screen 560. Game board 570 has a plurality of squares 580 arranged in a 4×4 array, although of course other arrangements would be possible. Each square 580 has an indicator 590 capable of indicating at least two states. In this embodiment, indicators 590 are actually groups of pixels which can be colored, have particular shapes, show pictures, flash, or have any other state which can be shown on video screen 560. For the purposes of discussion only, these indicators 590 will be described as being "on" or "off".

In FIG. 11A, three indicators 590 are in the "on" state and can be described as being activated indicators 600. As in the previous discussions of the present invention, only activated indicators 600 can cause a state change in corresponding indicators 590, as illustrated in FIGS. 11B–11M.

Figure 11B:
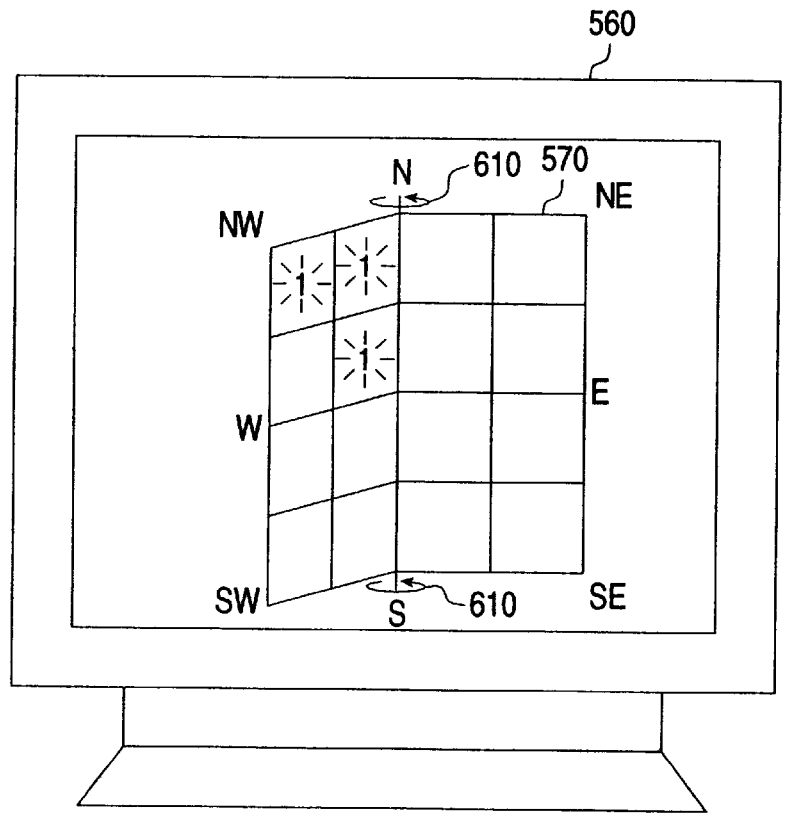

As noted above, FIG. 11A shows the starting display of the game of the present invention on video screen 560. In FIG. 11B, the first "fold" is started. One advantage of the computer game is that game board 570 which is shown on video screen 560 can actually appear to be physically folded in three-dimensions, as shown in FIG. 11B. The fold shown in FIG. 11B involves the rotation of the left side around the North-South axis, as demonstrated by the two arrows 610. Arrows 610 are shown only for clarity and may not necessarily appear on video screen 560.

Figure 11C:
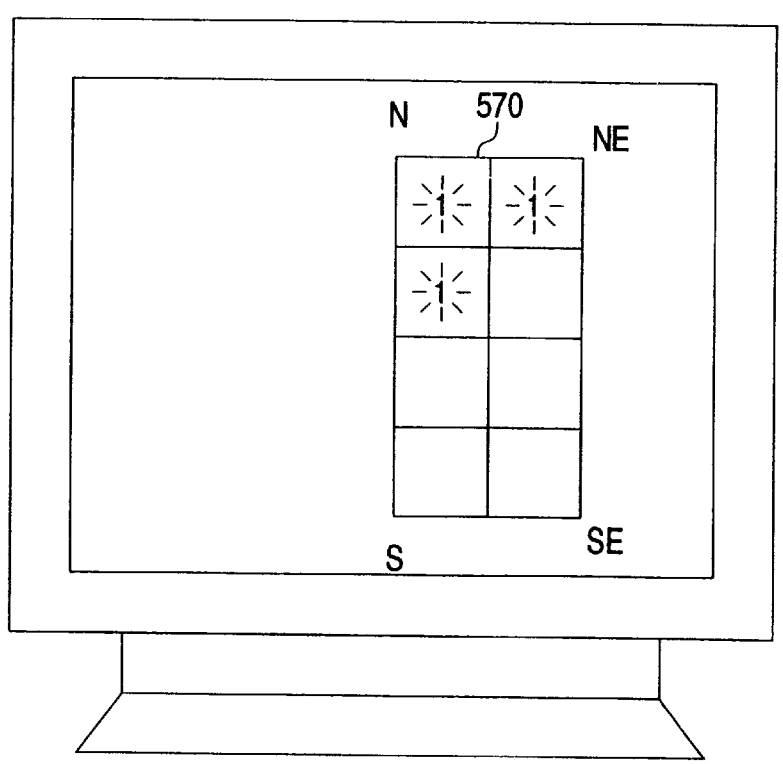
Figure 11D:
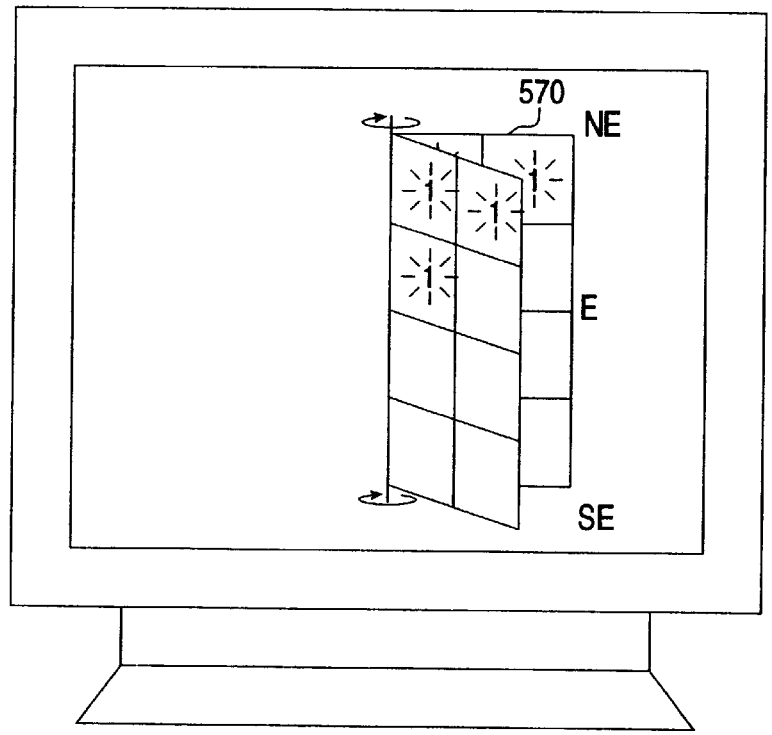
Figure 11E:
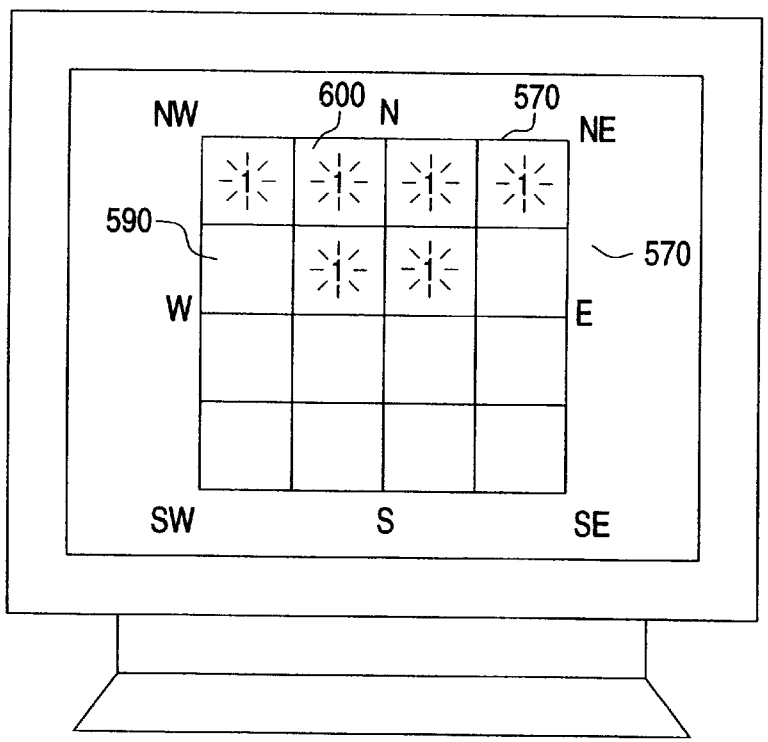
Figure 11F:
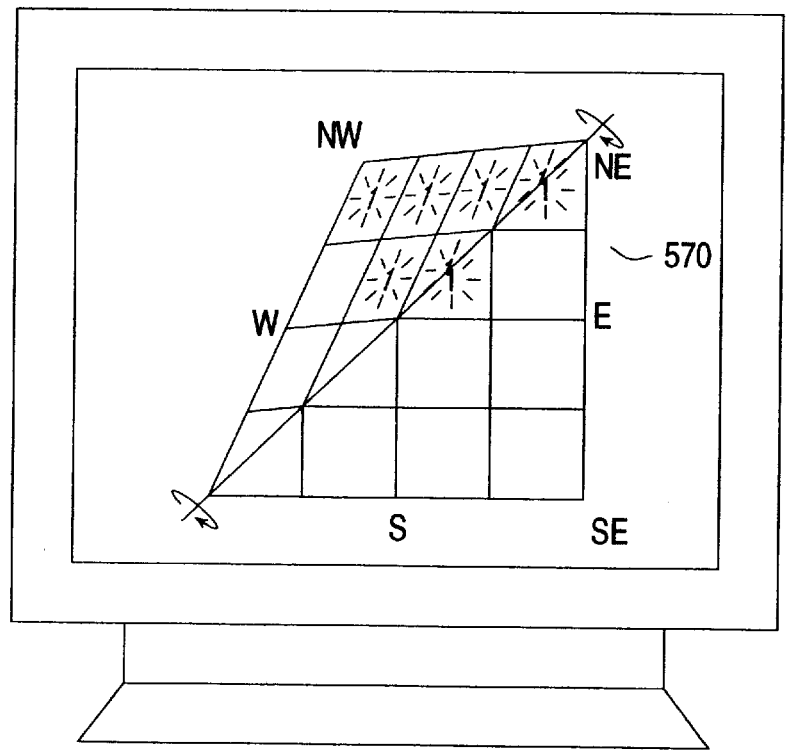
Figure 11G:
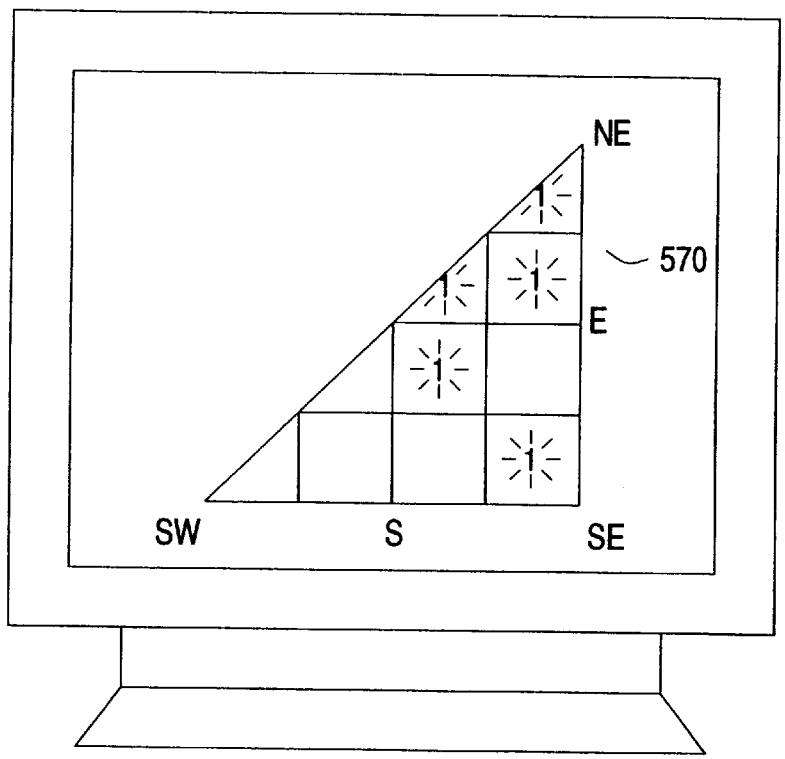

In FIG. 11C, the fold started in FIG. 11B is complete, and game board 570 appears to be folded in half. In FIG. 11D, game board 570 is starting to be unfolded. When game board 570 is completely unfolded, substantially the entirety of game board 570 is visible, as shown in FIG. 11E. The process of folding has caused three more indicators 590 to become activated indicators 600, also as shown in FIG. 11E.

Figure 11H:
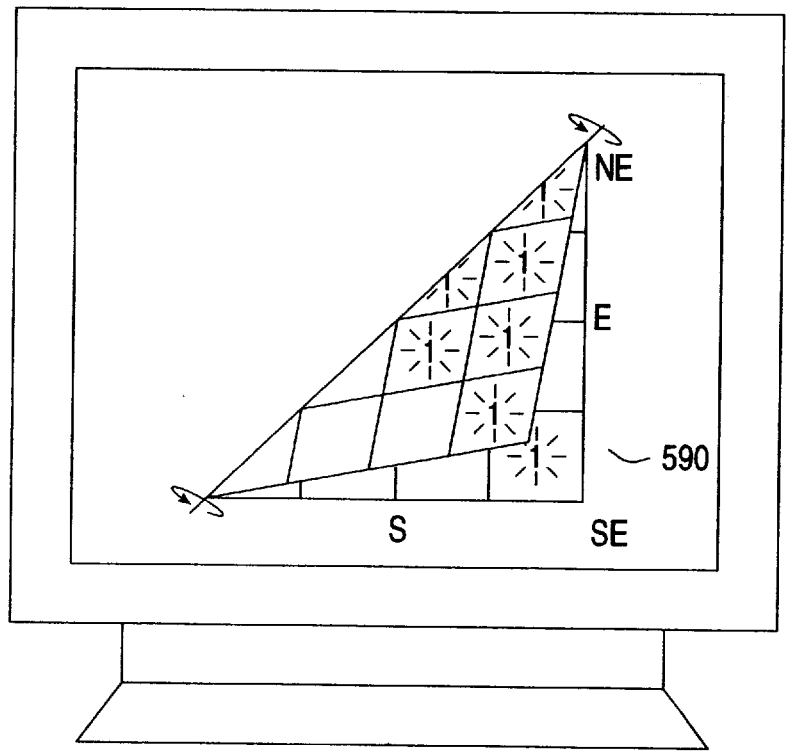
Figure 11I:
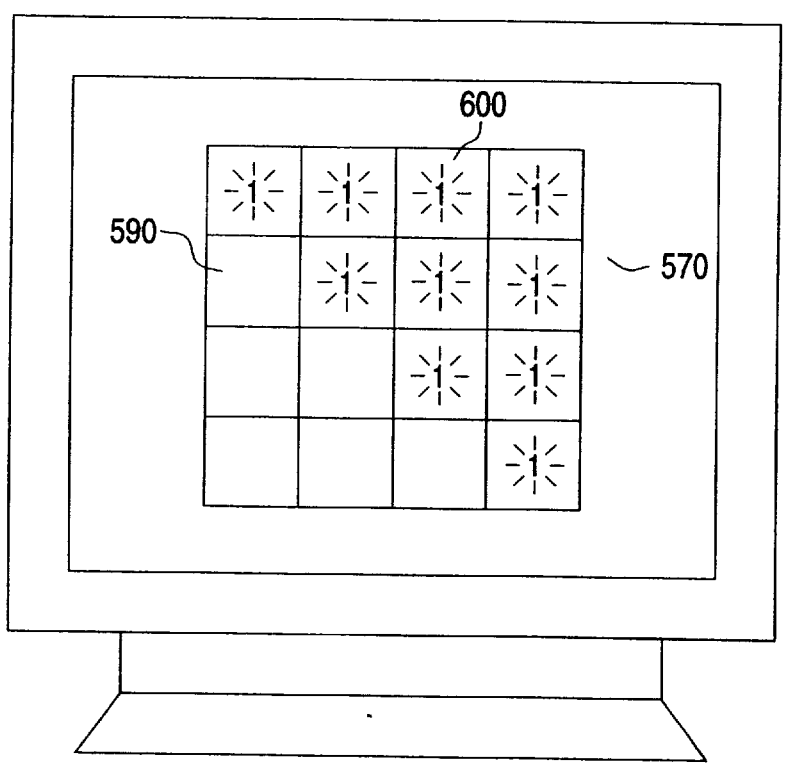

A more complex fold is demonstrated in FIGS. 11F–11I. Here, game board 570 is folded from the top left to the bottom right along the Northeast-Southwest axis. The fold is started in FIG. 11F and game board 570 is substantially completely folded in FIG. 11G. In FIG. 11H, the process of unfolding is started and is completed in FIG. 11I. Note that four more indicators 590 have changed state to become activated indicators 600.

Figure 11J:
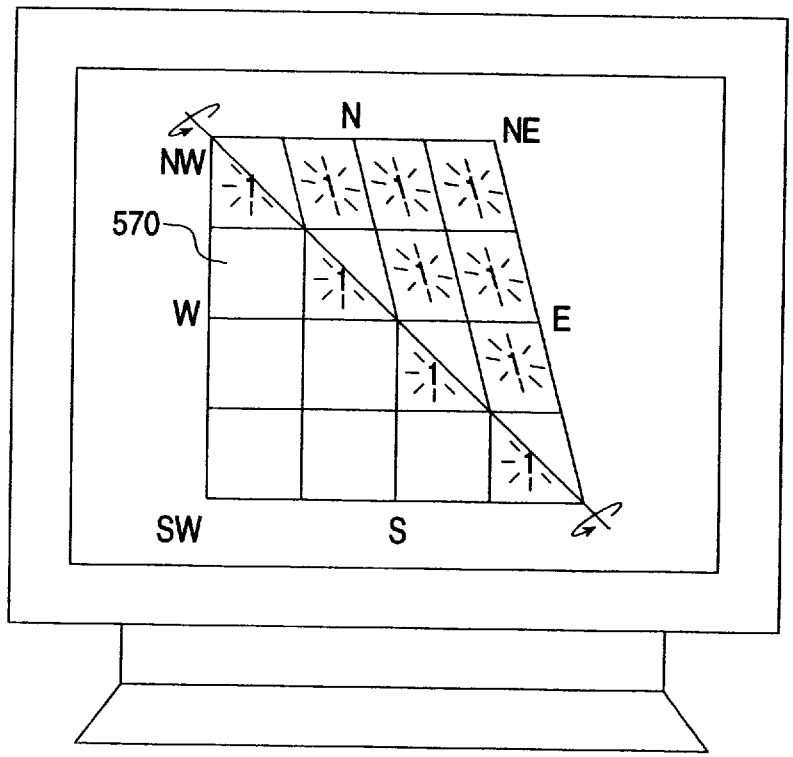
Figure 11K:
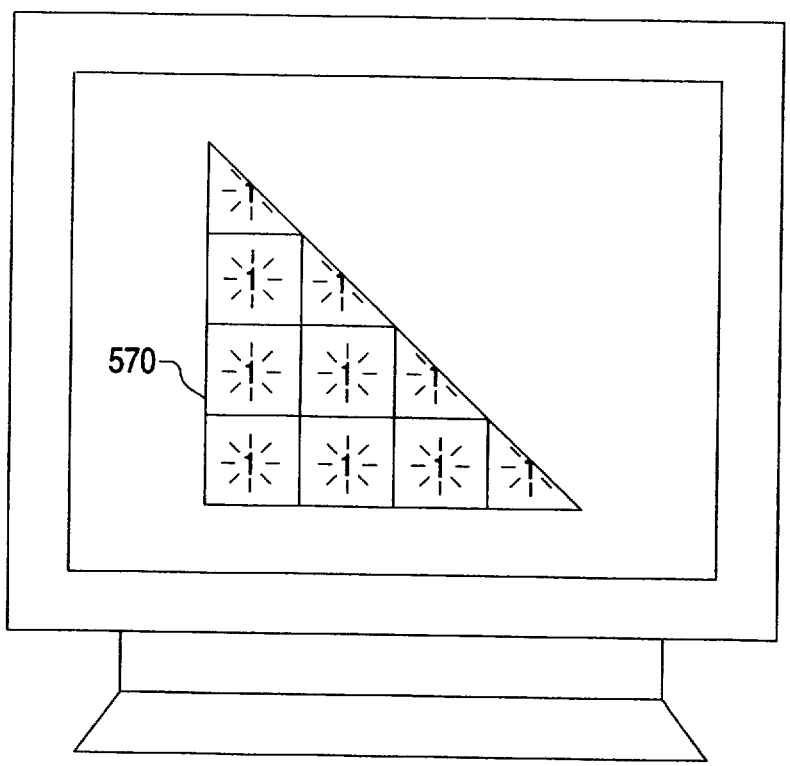
Figure 11L:
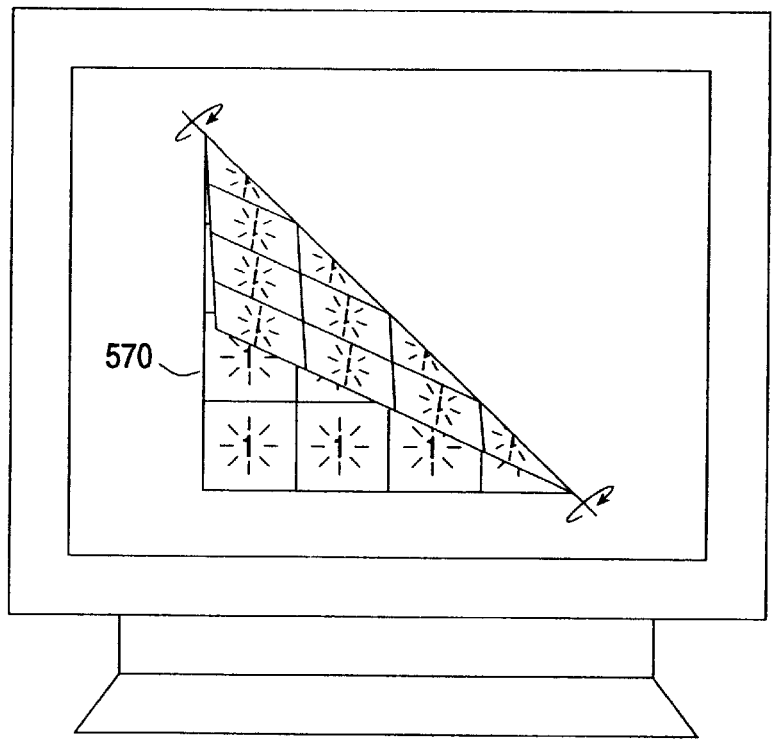
Figure 11M:
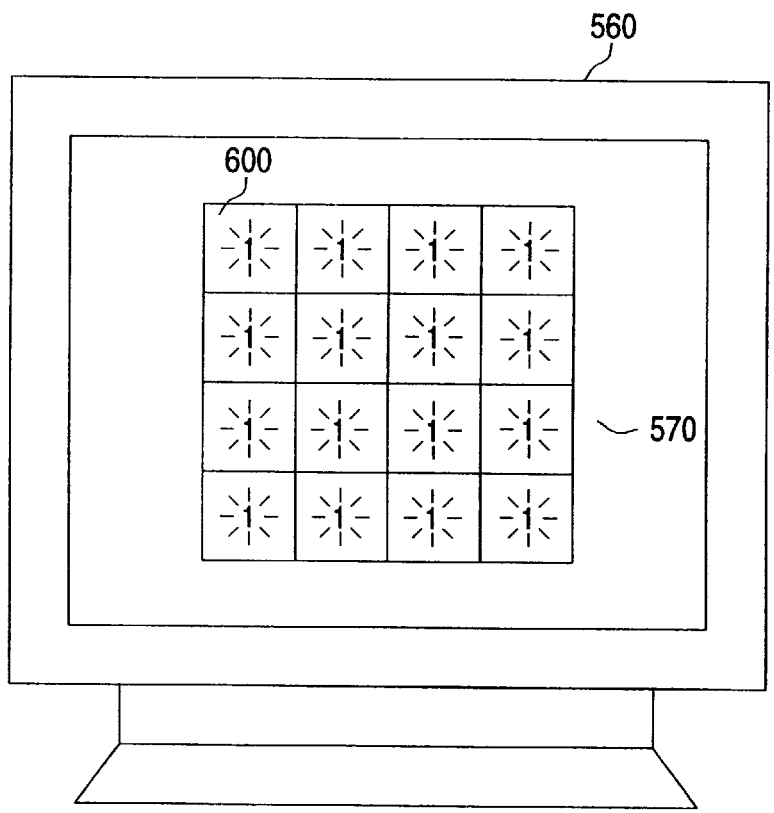

Another complex fold, which solves the puzzle, is shown in FIGS. 11J–11M. In FIG. 11J, game board 570 is starting to be folded from top right to bottom left along the Northwest-Southeast axis. Game board 570 is substantially completely folded in FIG. 11K. In FIG. 11L, game board 570 is starting to be unfolded, while in FIG. 11M, game board 570 is shown completely unfolded. Note that in FIG. 11M, all indicators 590 have become activated indicators 600, and the puzzle has been solved.

It will be appreciated that the above descriptions are intended only to serve as examples, and that many other embodiments are possible within the spirit and the scope of the present invention.

What is claimed is:

1. An electronic puzzle device, comprising:
   (a) an array of indicators, each of said indicators alternately indicating one of at least two states, said array having an axis dividing said array into a first portion and a second portion, and said array being folded along said axis such that at least one of said indicators in said first portion has a corresponding indicator in said second portion;

(b) a selection input for choosing a direction of said fold along said axis; and (c) a changer for changing said state of said corresponding indicator in said second portion depending upon said state of said at least one indicator in said first portion, such that if said at least one indicator in said first portion is in a first state, said state of said corresponding indicator in said second portion is changed, and alternatively if said at least one indicator in said first portion is in a second state, said state of said corresponding indicator in said second portion is not changed.

2. The electronic puzzle device of claim 1, wherein said array is substantially in the shape of a square.

3. The electronic puzzle device of claim 1, wherein said array is substantially in the shape of a cross.

4. The electronic puzzle device of claim 1, wherein said indicators are lights.

5. The electronic puzzle device of claim 4, wherein said indicators are LCD lights.

6. The electronic puzzle device of claim 5, wherein said LCD lights are back-lighted.

7. The electronic puzzle device of claim 4, wherein said indicators are LED lights.

8. The electronic puzzle device of claim 4, wherein one of said states is indicated by said light being turned off.

9. The electronic puzzle device of claim 1, wherein said first state is indicated by a first color and said second state is indicated by a second color.

10. The electronic puzzle device of claim 1, wherein said axis of said array is placed such that said array is divided into two exactly equal portions.

11. The electronic puzzle device of claim 1, wherein said axis of said array is placed such that said first portion is substantially larger than said second portion.

12. The electronic puzzle device of claim 1, further comprising an outer ring, said outer ring being attached to said array of indicators, such that the electronic puzzle device is grippable by said outer ring.

13. The electronic puzzle device of claim 12, wherein said selection input includes a tilt switch, said tilt switch featuring:

(a) a ball for rolling within said outer ring when the electronic puzzle device is tilted; and (b) a plurality of switches disposed within said outer ring, said switches being sequentially contacted by said ball when the electronic puzzle device is tilted, such that said direction of folding is detected.

14. The electronic puzzle device of claim 1, wherein said selection input includes a plurality of magnetic tilt switches, said magnetic tilt switches being attached to the electronic puzzle device, said magnetic tilt switches featuring:

(a) a sealed tube;

(b) a magnet for sliding within said tube when the electronic puzzle device is tilted; and (c) a Hall effect switch for being activated by said magnet, said Hall effect switch being located within said tube, such that when said Hall effect switch is activated by said magnet, said direction of folding is indicated.

15. The electronic puzzle device of claim 1, wherein said selection input includes a plurality of liquid tilt switches, said liquid tilt switches featuring:

(a) a sealed tube;

(b) a drop of liquid for sliding within said tube when the electronic puzzle device is tilted; and (c) a pair of contacts for being contacted by said drop of liquid, said contacts being located within said tube, such that when said contacts are contacted by said drop of liquid, said direction of folding is indicated.

16. The electronic puzzle device of claim 1, further comprising at least one solution, said solution being a predetermined pattern of said indicators, said pattern being determined according to said state of said indicators.

17. The electronic puzzle device of claim 1, wherein said changer includes a micro-controller.

18. The electronic puzzle device of claim 1, wherein said selection input includes a switch.

19. The electronic puzzle device of claim 16, wherein said pattern of solution includes having substantially all indicators in a single state.

20. The electronic puzzle device of claim 19, wherein said indicators are lights and said single state is selected from the group consisting of turned on and turned off.

21. The electronic puzzle device of claim 1, wherein said array has a three-dimensional shape.

22. The electronic puzzle device of claim 21, wherein said three-dimensional shape is of a sphere.

23. The electronic puzzle device of claim 1, further comprising a mode switch for selecting a pattern of indicator states.

* * * * *